Patented May 29, 1923.

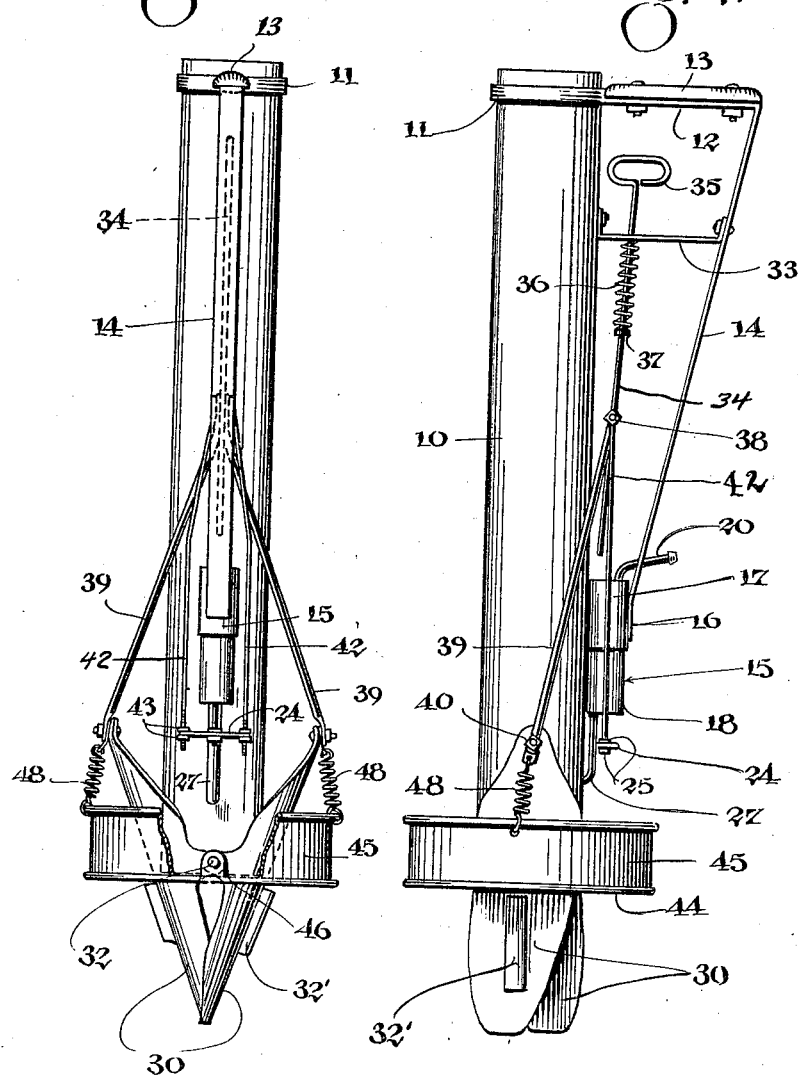

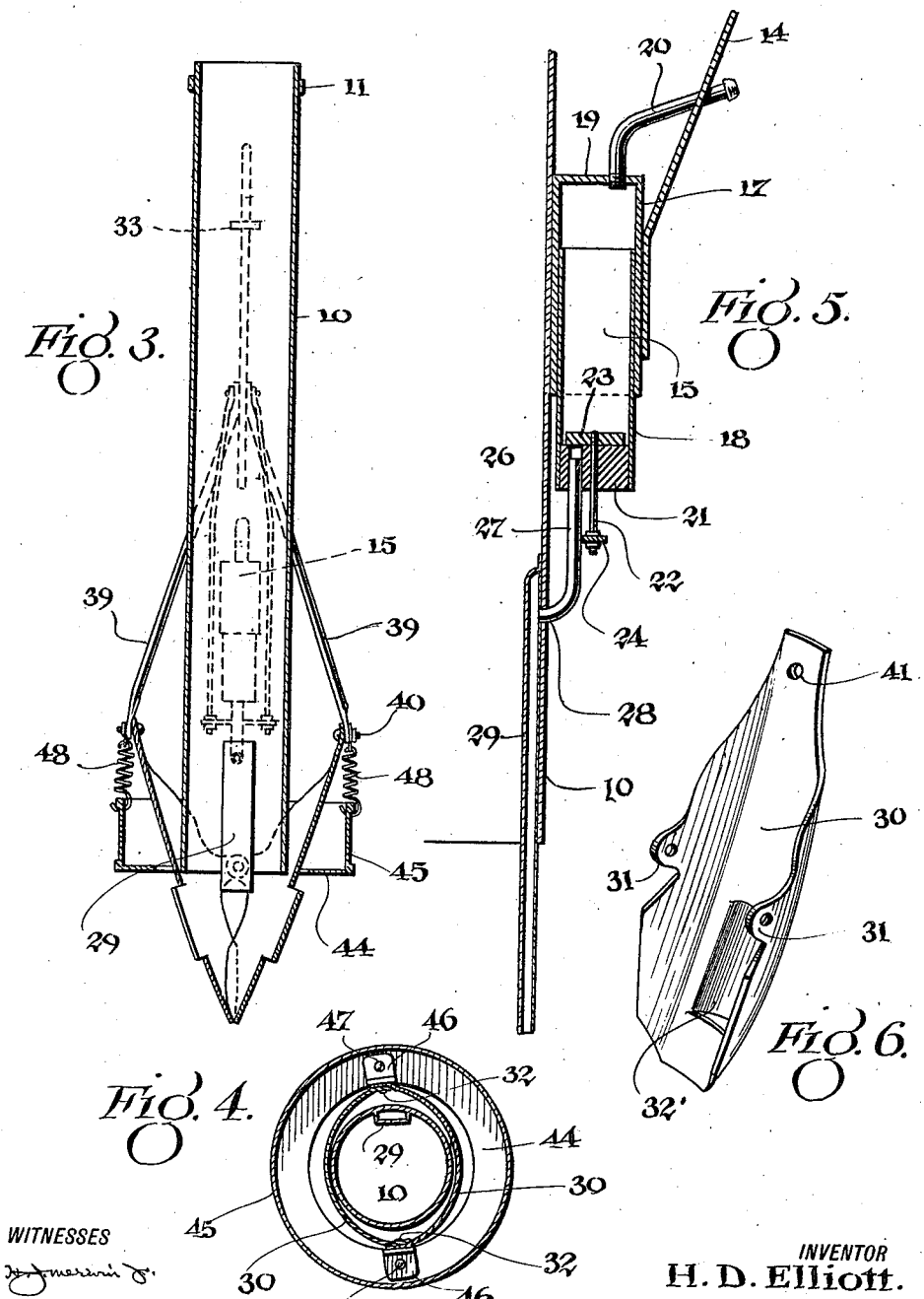

1,456,921

UNITED STATES PATENT OFFICE.

HENRY DEMASCUS ELLIOTT, OF TABOR, NORTH CAROLINA.

TRANSPLANTING DEVICE.

Application filed December 22, 1921. Serial No. 524,273.

*To all whom it may concern:*

Be it known that I, HENRY D. ELLIOTT, a citizen of the United States, and resident of Tabor, in the county of Columbus and State of North Carolina, have invented certain new and useful Improvements in Transplanting Devices, of which the following is a specification.

This invention relates to transplanting devices more particularly adapted for planting tobacco, cabbage, tomato plants and the like, and for use in connection with a transplanting device set forth in my co-pending application S. N. 524272, filed Dec. 22, 1921, the latter application being designed for boring an opening, hole or depression in the soil preparatory to planting, and the present device being designed to carry and deposit, as well as to irrigate or water the plants when set.

It is an object of the invention to provide a relatively simple device of this character which will serve to permit the plants to be efficiently deposited one at a time in the required depression or hole formed in the soil and to pack the loose soil so as to prevent the same from falling backward, the device being of novel and durable construction and not likely to get out of working order, as well as insuring the proper starting growth and production of healthy plants.

Referring to the drawings in detail the transplanter may be shown as comprising a barrel indicated generally by the reference numeral 10 and which is preferably made of thin sheet metal. Adjacent the upper end of the barrel there is fitted therearound a ring 11 which is formed with a laterally extending arm 12 terminating in a downwardly extending portion 14 which is secured at its free or lower end as at 16 to a sectional cylinder generally indicated by the reference character 15. The laterally extending arm 12 has bolted thereto a member 13 which is preferably of wood and adapted to enable an operator of the implement to easily grip the arm 12.

The sectional cylinder 15 may consist in the two telescopic sections 17 and 18, the uppermost section 17 being provided with an end closure 19 which has threaded therein the one end of a nipple 20. The lower end of the cylinder section 18 may have fitted therein a plug 21 which is provided with an orifice 26 communicating with the one end of a discharge pipe 27. A valve member 23 is positioned in the lower end of the cylinder section 18, said valve member being in the form of a circular plate as at 23 and having secured thereto a stem 22, said stem extending downwardly through a suitable opening in the plug 21 and having secured upon its lower end a cross head 24. The cylinder sections 17 and 18 may be secured to the barrel 10 in any desirable manner.

The lower end portion 28 of the pipe 27 communicates with a passageway formed by a channel-shaped member 29 which is secured upon the inside of the barrel 10 and which has a portion extending below said barrel 10, as shown to advantage in Figure 5.

A pair of spade-like members 30 are provided, each member being substantially channel shaped, the lower end of each member being cut away to form a point as shown to advantage in Figure 6. Each member is also formed with a pair of apertured ears 31, one upon each longitudinal edge thereof, and the upper end of each member is tapered as likewise shown in Figure 6. These spade-like members are disposed in opposing relation and encircling said members is a ring 45. The ring 45 is formed about its lower edge with an inwardly extending flange 44 and said flange carries a pair of upstanding clips 46. Each clip 46 is substantially L-shaped and one portion thereof secured to the flange 44 by means of a rivet or the like as at 47, Figure 4. The members 30 are brought in such relation that the associated lugs 31 thereof may overlap each other, and these associated lugs, in each instance, are pivoted to the upstanding portion of the associated clip 46 by the means of a pin as at 32. Also it should be here pointed out that each member 30 is provided with a protrusion adjacent the lower end thereof, said protrusion extending longitudinally of each member 30.

A cross member 33 is positioned between the downwardly extending portion 14 of the arm 12 and the barrel 10, and through this cross member there is slidable a rod 34. This rod terminates in its upper end in a handle 35. A coiled spring 36 encircles the upper end portion of the rod 34 and is interposed between the cross member 33 and a collar 37 secured upon the rod 34. The spring 36 is adapted to urge the rod 34 downwardly. The lower end of the rod 34 carries the bolt 38, said bolt extending through a suitable opening formed transversely of the rod and having pivotally connected thereto the upper ends of a pair of rods 42. Each rod 42 has its lower end threaded and extended through an opening in the associated end of the cross member 24. Also each rod carries a pair of nuts 43, one upon each side of the cross head 24 and thereby permitting the cross head 24 to be adjusted longitudinally of the rods 42.

The upper end of each member 30 is provided with an opening 41 through which there is extended a bolt 40. To each bolt 40 there is connected the one end of a coil spring 48, the other end of each coil spring being connected to the ring 45 at a point immediately beneath the bolt 40. To each of the bolts 40 there is pivotally connected the one end of a rod 39, said rods 39 extending upwardly and having their other ends connected to the bolt 38.

In the use of the present implement, it will be assumed that the operator carries a tank or other receptacle upon his shoulders which contains water or liquid fertilizer and which is connected to the tank 15 through the nipple 20. The operator may carry in one hand the plants to be set and with the other hand he may grasp the arm 12. The operator may drop a plant into the barrel 10, roots downwardly, and the same will lodge between the lower ends of the spade-like members 30. The operator may now place the spade-like members 30 into the soil and the flange 44 of the ring 45 will press the soil about the spade-like members 30. The spade-like members will penetrate the earth the required depth and then the handle 35 should be grasped by the fingers of the operator and the rod 34 lifted whereupon the lower ends of the spade-like members 30 will separate and permit the passage of the plant therethrough. Also simultaneous with this operation, the valve member 23 is lifted to uncover the orifice 26 thus permitting a quantity of liquid to pass downwardly from the cylinder 15 to a point below the barrel 10. The liquid will in fact enter the soil about the roots of the plant being set by a washing action of the soil. This liquid will insure that sufficient soil is placed about the roots of the plant and also insure an initial watering for the plant. The flow of the liquid will of course cease upon the handle 35 being released. It should be pointed out that the tamping action of the ring 45 and its flange 44 will further insure that sufficient earth or soil will surround the roots of the plant.

While I have shown and described the preferred form of my invention, I wish it to be understood, that I am aware of the fact that the construction, combination and arrangement of parts may be changed by those skilled in the art without departing from the spirit of the invention, as indicated by the appended claims.

A further object of the invention is to provide a transplanter which is relatively light and can be conveniently and simply operated by a person or farmer with the result that a large number of plants can be properly set in a short space of time.

Other and further objects of this invention will be apparent from the following description taken in conjunction with the accompanying drawings; wherein—

Figure 1 is a front elevation of the improved transplanter.

Figure 2 is a side elevation thereof.

Figure 3 is a vertical longitudinal sectional view along the tubular carrier or barrel of the transplanter at right angles to Figure 2.

Figure 4 is a transverse sectional view horizontally across the lower portion of the transplanter through the tamping device.

Figure 5 is an enlarged fragmentary vertical sectional view showing the watering device or control means.

Figure 6 is an enlarged perspective view of one of the sections of the earth auger and plant releasing and setting device.

Having thus described my invention, what I claim is:—

1. A transplanting device of the character described, comprising a delivery tube, an annular tamping member surrounding the lower end of said tube, a pair of pointed blades pivotally connected to each other intermediate their ends and disposed between the tamping member and delivery tube, and yieldable means for urging the upper ends of said blades outwardly with respect to each other, and means whereby the upper ends of said blades may be moved toward each other.

2. A transplanting device of the character described, comprising a delivery tube, an annular tamping member surrounding the lower end of said tube, a pair of spade-like blades pivoted to each other at a point intermediate their ends, said blades being disposed between the annular member and delivery tube, a yieldable connection between the upper end of each blade and the annular member adapted to hold the lower ends of said blades together, and operative means whereby the upper ends of said blades may be moved toward each other.

3. A transplanting device of the character described, comprising a delivery tube, an annular member surrounding the lower end of said tube, a pair of spade-like blades pivotally connected to each other at a point intermediate their ends and disposed between the tamping member and delivery tube, a yieldable connection between the upper end of each blade and the annular member, additional yieldable means for urging the upper ends of said blades outwardly with respect to each other, operative means whereby the upper ends of said blades may be moved toward each other, and means whereby upon the movement of the upper ends of said blades toward each other a quantity of liquid may be delivered into said delivery tube.

4. A transplanting device of the character described, comprising a delivery tube, an annular tamping member surrounding the lower end of said tube, a pair of spade-like blades pivotally connected to each other at a point intermediate their ends and disposed between the tamping member and delivery tube, a yieldable connection between the upper end of each blade and the annular member, additional yieldable means for urging the upper ends of said blades outwardly with respect to each other including a spring pressed rod, each spade-like member having one end connected to the rod whereby with longitudinal movement of said rod in one direction the lower ends of the blades will be separated.

5. A transplanting device of the character described, comprising a delivery tube, an annular tamping member surrounding the lower end of said tube, a pair of spade-like blades pivotally connected to each other at a point intermediate their ends and disposed between the tamping member and delivery tube, a yieldable connection between the upper end of each blade and the annular member, additional yieldable means for urging the upper ends of said blades outwardly with respect to each other including a spring pressed rod, each spade-like member having one end connected to the rod whereby with longitudinal movement of said rod in one direction the lower ends of the blades will be separated, a liquid tank, an outlet, a valve therefor, and connecting means between the spring pressed rod and valve whereby with the last named movement of said rod the valve will be operated to open said outlet, said outlet being adapted to discharge liquid between said spade-like members.

HENRY DEMASCUS ELLIOTT.